United States Patent
Fish et al.

(10) Patent No.: US 9,919,285 B2
(45) Date of Patent: Mar. 20, 2018

(54) SORBENTS

(71) Applicant: JOHNSON MATTHEY PUBLIC LIMITED COMPANY, London (GB)

(72) Inventors: Andrew Fish, Cleveland (GB); Matthew David Gwydion Lunn, County Durham (GB)

(73) Assignee: Johnson Matthey Public Limited Company, London (GB)

( * ) Notice: Subject to any disclaimer, the term of this patent is extended or adjusted under 35 U.S.C. 154(b) by 475 days.

(21) Appl. No.: 14/416,443

(22) PCT Filed: Jul. 10, 2013

(86) PCT No.: PCT/GB2013/051827
§ 371 (c)(1),
(2) Date: Jan. 22, 2015

(87) PCT Pub. No.: WO2014/016561
PCT Pub. Date: Jan. 30, 2014

(65) Prior Publication Data
US 2015/0202591 A1      Jul. 23, 2015

(30) Foreign Application Priority Data

Jul. 26, 2012  (GB) .................................. 1213361.7

(51) Int. Cl.
| | |
|---|---|
| *B01D 53/02* | (2006.01) |
| *B01J 20/02* | (2006.01) |
| *B01J 20/28* | (2006.01) |
| *B01J 20/30* | (2006.01) |
| *B01J 20/32* | (2006.01) |
| *B01D 15/08* | (2006.01) |
| *B01J 20/08* | (2006.01) |
| *C23C 2/04* | (2006.01) |

(52) U.S. Cl.
CPC .......... *B01J 20/0237* (2013.01); *B01D 15/08* (2013.01); *B01D 53/02* (2013.01); *B01J 20/0244* (2013.01); *B01J 20/0285* (2013.01); *B01J 20/08* (2013.01); *B01J 20/2803* (2013.01); *B01J 20/28016* (2013.01); *B01J 20/3042* (2013.01); *B01J 20/3085* (2013.01); *B01J 20/3204* (2013.01); *B01J 20/3225* (2013.01); *B01J 20/3236* (2013.01); *C23C 2/04* (2013.01)

(58) Field of Classification Search
CPC ...... B01D 15/08; B01D 53/02; B01J 20/0237; B01J 20/0244; B01J 20/0285; B01J 20/08; B01J 20/28016; B01J 20/2803; B01J 20/3042; B01J 20/3085; B01J 20/3204; B01J 20/3225; B01J 20/3236; C23C 2/04
See application file for complete search history.

(56) References Cited

U.S. PATENT DOCUMENTS

| | | | |
|---|---|---|---|
| 5,245,106 A | 9/1993 | Cameron et al. | |
| 2009/0272675 A1* | 11/2009 | Ratnasamy | B01J 20/0222 208/227 |
| 2011/0226700 A1* | 9/2011 | Hetherington | B01D 15/00 210/688 |
| 2013/0204065 A1* | 8/2013 | Kanazirev | B01D 15/00 585/824 |

FOREIGN PATENT DOCUMENTS

| | | |
|---|---|---|
| EP | 0 243 052 A2 | 10/1987 |
| EP | 0 293 298 A1 | 11/1988 |
| WO | 2008/020250 A1 | 2/2008 |
| WO | 2009/101429 A1 | 8/2009 |
| WO | 2010/061212 A1 | 6/2010 |
| WO | 2013/136046 A1 | 9/2013 |

OTHER PUBLICATIONS

International Search Report, dated Oct. 28, 2013, from corresponding PCT application.

* cited by examiner

*Primary Examiner* — Christopher P Jones
(74) *Attorney, Agent, or Firm* — Baker & Hostetler LLP

(57) ABSTRACT

A sorbent is described, suitable for removing heavy metals, particularly mercury, from fluid streams including 20-75% by weight of copper (expressed as copper (II) oxide) in the form of one or more copper sulphides, the sorbent having a sulphur to copper atomic ratio in the range 0.7 to 0.95:1.

13 Claims, No Drawings

SORBENTS

This invention relates to copper sorbents suitable for the removal of heavy metals such as mercury from fluid streams.

Heavy metals may be found in a number of process fluids used or of process fluids created by industrial processes, particularly those derived from coal, crude oil and some natural gas reserves. Their removal is necessary for the safe and environmentally sound processing of these fluids. For example, emission of heavy metals such as mercury, arsenic, selenium and cadmium from natural gases, associates gases or synthesis gases has become a major environmental concern. The mercury may be in the form of elemental mercury, or organomercuric, or organomercurous compounds. Typically the concentration of mercury in a gaseous feed stream is from 0.01 to 1100 $\mu g/Nm^3$, and more usually between 10 to 600 $\mu g/Nm^3$.

Conventional sorbents for removing mercury are described, for example, in EP-A-00243052. Improved compositions are described in WO2008/020250 and WO2009/101429. These sorbents necessarily only contain divalent copper.

WO2010/061212 claims a reduced copper sorbent in the form of a shaped unit containing 0.1% by weight heavy metal and 4-75% by weight of copper in the form of one or more reduced copper sulphides that have a sulphur to copper atomic ratio of ≤0.6:1. In these sorbents preferably essentially all of the copper is monovalent so as to avoid an undesirable exothermic reduction of the copper when used in reducing gas streams.

We have found surprisingly that pre-reduced sulphided sorbents prepared by a controlled partial reduction of a portion of the divalent copper produces a sorbent with enhanced activity compared to conventional divalent copper or reduced monovalent copper sorbents.

Accordingly the invention provides a sorbent, suitable for removing heavy metals, particularly mercury, from fluid streams comprising 20-75% by weight of copper (expressed as copper (II) oxide) in the form of one or more copper sulphides, said sorbent having a sulphur to copper atomic ratio in the range 0.7 to 0.95:1.

The invention further provides a method for the production of a sorbent comprising 20-75% by weight of copper (expressed as copper (II) oxide) in the form of one or more copper sulphides, said sorbent having a sulphur to copper atomic ratio in the range 0.7 to 0.95:1, comprising the steps of:
(i) making a sorbent precursor comprising an oxide or hydroxycarbonate of copper,
(ii) sulphiding the sorbent precursor with a gas mixture comprising hydrogen sulphide to form a sulphided copper material, and then
(iii) partially reducing the sulphided copper material to a lower oxidation state to form the sorbent,
wherein the sorbent precursor or sorbent is shaped.

The invention further provides a process for the removal of heavy metals from process fluids by contacting the process fluid with the sorbent.

By the term "sorbent" we include adsorbent and absorbent.

The term "heavy metal" used herein includes mercury, arsenic, lead, cadmium and antimony, particularly mercury and arsenic.

The effectiveness of the partially-reduced copper sulphide sorbents of the present invention is surprising in view of the fact that the accepted mechanism for copper sulphide mercury sorbents requires divalent copper sulphide (in which the sulphur to copper atomic ratio is 1:1) as the "active component" and produces the "inactive monovalent" copper sulphide as the by-product.

It will be understood that the sorbents of the present invention are distinct from used or 'spent' divalent copper-based sorbents, which generally contain mercury or other heavy metals in the range 1-20% by weight. The sorbents of the present invention as installed are essentially free of heavy metals.

In the sorbents of the present invention, the total copper content (expressed as copper (II) oxide) is in the range 20-75% by weight, preferably 20-40% by weight.

The copper sulphide in the present invention is a mixture of divalent CuS and one or more monovalent-copper-containing sulphides. The presence of the different copper sulphides may be readily determined using X-Ray Diffractometry (XRD). The partial reduction produces a sorbent with a S:Cu atomic ratio in the range 0.7-0.95, preferably 0.8-0.95, more preferably 0.8-0.9. The sorbents are therefore distinct from those in the prior art that are essentially divalent (wherein the S:Cu atomic ratio is 1:1) and those of WO2010/061212.

The ratio of sulphur to copper in the sorbent is preferably used to indicate the presence of reduced copper sulphides. The ratio of sulphur to copper may be readily determined using known methods. For example, the sulphur content of solids may be determined by combustion of the sample at 1300° C. and subsequent IR analysis to quantify the amount of $SO_2$ evolved. The copper content of solids may determined by digestion of the sample in suitable acids and subsequent quantification using ICP atomic emission spectroscopy. Alternatively the copper content may be determined using quantitative X-Ray Fluoresecence spectroscopy (XRF), using known methods.

The sorbents desirably comprise a support and/or binder in addition to the reduced copper sulphide.

In one embodiment, the sorbent comprises a partially-reduced copper sulphide supported on a shaped support. In this case, a copper compound may be coated as a slurry onto or impregnated into a shaped support such as pellet, extrudate or monolith, then the copper compound optionally converted into copper oxide by calcination, and then the copper compound or copper oxide sulphided and then partially reduced. In a preferred embodiment the sorbent comprises a coated shaped support prepared by applying a layer of a copper compound on the surface of the shaped support material by dipping or spraying the shaped support material with a slurry of copper compound, and drying the coated support material.

In an alternative embodiment, the sorbent comprises one or more powdered copper-containing materials that have been shaped with the aid of a binder, sulphided and partially-reduced. The shaped sorbent thereby comprises one or more partially reduced copper sulphides and a binder. Binders that may be used to prepare the shaped units include clays such as bentonite, sepiolite, minugel and Attapulgite clays, cements, particularly calcium aluminate cements such as ciment fondu, and organic polymer binders such as cellulose binders, or a mixture thereof. Particularly strong shaped units may be formed where the binder is a combination of a cement binder, such as a calcium aluminate, and an aluminosilicate clay binder having an aspect ratio >2, such as an Attapulgite clay. In such materials, the relative amounts of the cement and clay binders may be in the range 1:1 to 3:1 (first to second binder). The total amount of the binder may be in the range 5-30% by weight (based upon the sulphided composition). In a preferred embodiment, the sorbent comprises one or more powdered copper-containing materials that have been combined with a powdered support material and shaped with the aid of a binder, then dried if necessary, sulphided and reduced. The shaped sorbent thereby consists essentially of one or more partially-reduced copper sulphides, a support material and one or more binders.

The support may be any inert support material suitable for use in preparing sorbents. Such support materials are known and include alumina, metal-aluminate, silica, titania, zirconia, zinc oxide, aluminosilicates, zeolites, metal carbonate, carbon, or a mixture thereof. Support materials are desirably oxide materials such as aluminas, titanias, zirconias, silicas and aluminosilicates. Hydrated oxides may also be used, for example boehmite or alumina trihydrate. Preferred supports are hydrated aluminas or transition aluminas such as gamma, theta and delta alumina. The support may be present in an amount in the range 25-90% wt, preferably 70-80% wt (based upon on the sulphided composition).

Other components may also be present in the sorbent to enhance the physical properties of the sorbent. Other such additives include zinc compounds such as zinc oxide, zinc carbonate or zinc hydroxycarbonate, or other transition metal compounds, which may become sulphided during manufacture. The amount of such additives may be up to 30% by weight (based on the sulphided composition). However, where high water-tolerance of the sorbent is required, the zinc sulphide content of the sorbent is preferably ≤5% by weight, more preferably ≤1% wt, most preferably ≤0.5% wt, especially ≤0.1% wt (based on the sulphided composition).

The sorbent may be in the form of pellets, extrudates or granules. The pellets, extrudates or granules preferably have a minimum dimension in the range 1 to 15 mm and a maximum dimension in the range 1 to 25 mm, with an aspect ratio (longest dimension divided by shortest dimension) ≤4. Spherical granules with a diameter in the range 1-15 mm are preferred.

The method for making the sorbent of the present invention desirably comprises the steps of: (i) making a sorbent precursor comprising one or more of an oxide or hydroxycarbonate of copper, and optionally a support or binder, (ii) sulphiding the precursor with a gas mixture comprising hydrogen sulphide to form a sulphided composition and then (iii) partially reducing the sulphided composition to provide a partially reduced copper sulphide sorbent in which the S:Cu atomic ratio is in the range 0.7-0.95. The support, sorbent precursor or sorbent itself may be shaped.

The sorbent precursor may be made by impregnating a support material, which may be in the form of a powder, monolith, honeycomb, foam or shaped unit such as a tablet, extrudate or granule, with a solution of a soluble salt of copper, such as the nitrate, chloride actetate or sulphate, preferably the nitrate, followed by drying and calcining the impregnated support to convert the copper compound to copper oxide. Such a method is useful for preparing sorbents containing up to about 25% by weight copper. Higher amounts may require too many impregnation and drying steps to be practical at an industrial scale.

Alternatively the sorbent precursor may be made by applying a layer of a copper compound on the surface of a shaped support material, such as a pellet, granule, extrudate or monolith, by dipping or spraying the shaped support with a slurry of copper oxide or basic copper carbonate, and drying the coated support material. The slurry is preferably applied so that the thickness of the copper compound layer on the dried support is in the range 1-200 μm.

Alternatively, the sorbent precursor may be made simply by combining a particulate copper sulphide precursor compound selected from an oxide, hydroxide, carbonate or hydroxycarbonate of copper, with a powdered support material and one or more binders. This method may be used to prepare sorbents containing up to 75% by weight copper. The copper sulphide precursor compound may be commercially sourced or may be generated, e.g. by precipitation from a solution of metal salts using alkaline precipitants, e.g. an alkali metal carbonate and/or alkali metal hydroxide, using known methods, followed by drying and optionally calcination. Thus in one embodiment, a copper sulphide precursor compound may be made by precipitating copper-hydroxycarbonate and optionally zinc-hydroxycarbonate in the presence of a hydrous alumina support using an alkali metal carbonate and alkali metal hydroxide precipitant mixture, followed by washing and drying the precipitate.

Where the sorbent precursor is in the form of a powder it is preferably shaped, and if need be dried, prior to sulphidation and reduction. Alternatively the material may be shaped after sulphidation but before partial reduction or the sulphided and partially reduced material, i.e. the sorbent, may be shaped.

Sorbent tablets may be formed by moulding a powder composition, generally containing a material such as graphite or magnesium stearate as a moulding aid, in suitably sized moulds, e.g. as in conventional tableting operation. Alternatively, the sorbent may be in the form of extruded pellets formed by forcing a suitable composition and often a little water and/or a moulding aid as indicated above, through a die followed by cutting the material emerging from the die into short lengths. For example extruded pellets may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length.

Alternatively, the sorbent may be in the form of agglomerates formed by mixing a powder composition with a little water, insufficient to form a slurry, and then causing the composition to agglomerate into roughly spherical, but generally irregular, granules. The different shaping methods have an effect on the surface area, porosity and pore structure within the shaped articles and in turn this often has a significant effect on the sorption characteristics and on the bulk density.

Thus beds of sorbents in the form of moulded tablets may exhibit a relatively broad absorption front, whereas beds of agglomerates can have a much sharper absorption front: this enables a closer approach to be made to the theoretical absorption capacity. On the other hand, agglomerates generally have lower bulk densities than tableted compositions. It is preferred to make the shaped units in the form of agglomerates and thus a preferred preparation method involves forming spherical sorbent precursor agglomerates comprising particles of the copper sulphide precursor compound, one or more binders and optionally a support material in a granulator.

Where the sorbent precursor is shaped using a solvent, such as water, the shaped precursor units are preferably dried before sulphiding. Drying temperatures up to 120° C. may be used.

The sorbent precursor is preferably sulphided using a gas mixture comprising hydrogen sulphide. Using a hydrogen sulphide-containing gas mixture is considerably easier and faster than using alternatives such as solutions of sulphur or sulphur compounds such as polysulphides. The gas mixture may, if desired, contain other sulphur compounds such as carbonyl sulphide or volatile mercaptans. Inert gases such as nitrogen, helium or argon may also be present. Hydrogen sulphide is preferably provided to the precursor in gas streams at concentrations of 0.5 to 5% by volume. Sulphiding temperatures in the range 1-150° C., preferably 5-50° C. may be used. Sulphiding produces a sulphided sorbent precursor in which the Cu is divalent and so has a S:Cu atomic ratio of 1:1.

In order to produce the sorbent according to the present invention the sulphided sorbent precursor is subjected to a partial reduction step using a reducing gas stream. The reducing gas stream preferably comprises hydrogen. Pure hydrogen may be used but preferably gas mixtures containing hydrogen such as hydrogen in nitrogen or synthesis gases (mixtures of hydrogen, carbon monoxide and carbon dioxide) are used. Particularly preferred reducing gases are hydrogen/nitrogen gas mixtures containing 20-80% $H_2$ by volume. Reduction temperatures in the range 150-350° C., preferably 175-300° C., especially 200-250° C. may be used. Below 150° C. reduction can take place, but the reduction rate is too inefficient for industrial use. In a preferred embodiment, partial reduction is performed using a gas flow of 50% hydrogen/50% nitrogen v/v at 210° C. The pressure of the reducing gas may be in the range 0-10 barg, preferably 0.2-5 barg. The reduction may be carried out in an up-flow or down-flow axial fixed bed reactor, a radial flow fixed bed reactor, fluidized bed reactor, ebullient bed reactor or moving-bed reactor. Reduction should proceed until the S:Cu ratio is within the desired range. Reduction causes the evolution of H2S from the sulphided sorbents and means are desirably provided to capture the H2S from the reducing gas stream. Reduction times of 5-24 hrs are preferred with hydrogen/nitrogen gas mixtures.

Because the sorbent is required to have a S:Cu atomic ratio in the range 0.7-0.95, it is necessary to pre-reduce the sorbent ex-situ. This allows better control of the partial reduction and manages the release of hydrogen sulphide from the sulphided material upon exposure to a hydrogen-containing reducing gas.

The process for the removal of heavy metals, particularly mercury, arsenic selenium and cadmium from process fluids may be carried out simply by contacting the fluid with the partially reduced copper sulphide sorbent in a suitable vessel.

In order to provide process-efficient materials that allow for suitable absorption vessel sizes, it is preferred that the density of the absorbent, expressed as the sulphur density, is in the range 50 to 200 kg $S/m^3$.

The present invention may be used to treat both liquid and gaseous fluids containing heavy metals, particularly mercury. The mercury may be in the form of elemental mercury, or organomercuric, or organomercurous compounds. The present invention is particularly effective in removing elemental mercury although other forms of mercury may be removed for short periods.

In one embodiment, the process fluid is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process of the invention, e.g. natural gas or refined paraffins or olefins, for example. Off-shore crude oil and off-shore natural gas streams in particular may be treated with the absorbent of the present invention. Contaminated fuels such as petrol or diesel may also be treated. Alternatively, the hydrocarbon may be a condensate such as natural gas liquid (NGL) or liquefied petroleum gas (LPG), or gases such as a coal bed methane, landfill gas or biogas.

Non-hydrocarbon fluids which may be treated according to the invention include carbon dioxide, which may be used in enhanced oil recovery processes or in carbon capture and storage, solvents for decaffeination of coffee, flavour and fragrance extraction, solvent extraction of coal etc. Fluids, such as alcohols (including glycols) and ethers used in wash processes or drying processes (e.g. triethylene glycol, monoethylene glycol, Rectisol™, Purisol™ and methanol), may be treated by the inventive process. Heavy metal may also be removed from amine streams used in acid gas removal units. Natural oils and fats such as vegetable and fish oils may be treated by the process of the invention, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

Preferably the absorption of heavy metal, particularly mercury, from such fluids is conducted at a temperature below 150° C., preferably at or below 120° C. in that at such temperatures the overall capacity for mercury absorption is increased. Temperatures as low as 4° C. may be used to good effect in the present invention. A preferred temperature range is 10 to 60° C.

The present invention may also be used to treat both liquid and gaseous fluids containing one or more reductants such as hydrogen and/or carbon monoxide. In one embodiment, the fluid is a liquid hydrocarbon stream containing dissolved hydrogen and/or carbon monoxide. Such liquids are preferably treated with the sorbent at temperatures in the range 0-150° C., preferably 10-100° C. In another embodiment, the fluid is a gaseous stream containing hydrogen and/or carbon monoxide, i.e. a reducing gas stream. Such gases are preferably treated with the sorbent at temperatures in the range 0-150° C. In a preferred embodiment, the process is used for the removal of heavy metals, particularly mercury, arsenic selenium and cadmium from reducing gas streams comprising hydrogen and/or carbon monoxide. Such reducing gas streams may be contacted with the sorbent at a temperature up to 150° C. Gas streams that may benefit from this process include synthesis gas streams from conventional steam reforming processes and/or partial oxidation processes, but particularly synthesis gas streams from a coal gasifier, e.g. as part of a IGCC process after gas washing and heat recovery (cooling) steps.

Other streams that may benefit from the present invention include hydrogen gas streams, refinery vent streams, refinery cracker streams, blast furnace gases, reducing gases used by the glass industry or steel hardening processes, ethylene-rich streams and liquid or gaseous hydrocarbon streams, e.g. naphtha, fed or recovered from hydrotreating processes, such as hydrodesulphurisation or hydrodenitrification.

The invention is further illustrated by reference to the following Examples.

EXAMPLE 1: MATERIAL PREPARATION

A sorbent precursor was prepared using a granulation technique wherein basic copper carbonate (35 parts by weight), alumina trihydrate (51 parts by weight), calcium aluminate (14 parts by weight) and attapulgite clay (14 parts by weight) were combined with a little water and mixed to form granules in a Hobart mixer. The recovered granulated material was dried and then sulphided using 1% $H_2S$ in $N_2$ at ambient temperature and pressure (Sorbent A). The copper content of the dried un-sulphided precursor was 22.1% wt (expressed as copper (II) oxide).

A partially reduced sorbent (Sorbent B) was prepared by the partial reduction of sorbent A in a gas flow of 50% hydrogen/50% nitrogen v/v at 210° C. for 8 hours (GHSV=700 $hr^{-1}$, reactor ID=30 mm, bed volume=30 ml, flow rate=21 $NL.hr^{-1}$).

For comparison a fully reduced sorbent (Sorbent C) was prepared by the complete reduction of sorbent A in a gas flow of 100% hydrogen at 210° C. for 24 hours (all other conditions as with sorbent B).

Further partially reduced sorbents were prepared by reducing portions of Sorbent A in a gas flow of 50% hydrogen/50% nitrogen v/v at 210° C. for 5, 8 and 24 hours (GHSV=700 $hr^{-1}$, reactor ID=30 mm, bed volume=30 ml, flow rate=21 $NL.hr^{-1}$) to prepare sorbents D, E & F respectively.

The sulphur to copper atomic ratios in the sorbents were determined by combustion of a sample at 1300° C. and subsequent IR analysis to quantify the amount of $SO_2$ evolved using a LECO SC632. The copper content of the sorbents was determined using quantitative X-Ray Fluoresecence spectroscopy (XRF). The results are given in table 1.

TABLE 1

| Sorbent | Measured S:Cu atomic ratio |
| --- | --- |
| Comparative A | 0.98 |
| B | 0.84 |
| Comparative C | 0.57 |
| D | 0.94 |
| E | 0.89 |
| F | 0.72 |

EXAMPLE 2: GAS PHASE TESTING

Sorbents A, B and C were individually charged (15 ml) to a glass reactor (19 mm ID). A flow of 100% % nitrogen was passed through a bubbler containing elemental mercury to allow the gas to pick up the mercury. The mercury-laden gas was then passed downflow through the reactor under the following conditions.

| | |
| --- | --- |
| Pressure: | 3 psig |
| Temperature | ambient |
| Gas flow | 6.8 NL · $hr^{-1}$ |
| Contact time | 8 seconds |
| Test duration | 1175 hours (A & C) or 550 hours (B) |

Samples from the reactor inlet and exit were periodically analysed for mercury content by atomic fluorescence detection. The inlet gas was saturated at ambient temperature giving a mercury concentration at the inlet of about 13,000 μm/$m^3$. The sorbents A & B reduced the mercury content of the exit gas to below detectable limits throughout the test. The results are given in Table 2.

TABLE 2

| | | Comparative Sorbent A | Sorbent B | Comparative Sorbent C |
| --- | --- | --- | --- | --- |
| Bulk S:Cu atomic ratio | | 0.98 | 0.84 | 0.57 |
| Mercury | Bed 1 | 5.64 | 2.04 | 0.67 |
| loading, | Bed 2 | 0.60 | 0.09 | 0.69 |
| wt. % | Bed 3 | 0.06 | <0.01 | 0.63 |
| | Bed 4 | <0.01 | <0.01 | 0.76 |
| | Bed 5 | <0.01 | <0.01 | 0.65 |

The un-reduced Sorbent A is an effective mercury sorbent. The fully reduced sorbent C is poor in comparison due to its lower capacity. The partially reduced sorbent according to the present invention (sorbent B) despite the shorter run, clearly provides improved mercury capture.

EXAMPLE 3: LIQUID PHASE ACTIVITY TESTING

Sorbents A, C & D, E, F were tested for mercury removal activity in the liquid phase by contact with a solution of elemental mercury in n-hexane, which contained ca. 500 p.p.b. w/v. The materials were stirred in the solution, with regular samples taken over 20 minutes to determine the mercury concentration using atomic fluorescence spectroscopy. The first order rate constants, k ($min^{-1}$), were determined as the gradient of a plot of $ln(Hg_o/Hg_x)$ against reaction time. The results are given in table 3.

TABLE 3

| Sorbent | Bulk S:Cu atomic ratio | Rate constant, k, $min^{-1}$ |
| --- | --- | --- |
| Comparative A | 0.98 | 0.09 |
| D | 0.94 | 0.20 |
| E | 0.89 | 0.28 |
| F | 0.72 | 0.16 |
| Comparative C | 0.57 | 0.14 |

The rate constants for sorbents D, E and F are surprisingly better than those for sorbents A and C.

The invention claimed is:

1. A sorbent suitable for removing mercury from fluid streams comprising 20-75% by weight of copper (expressed as copper (II) oxide) in the form of granules comprising one or more copper sulphide, a support and a binder, said sorbent having a sulphur to copper atomic ratio in the range 0.7 to 0.95:1, wherein the sorbent is formed by:
   (i) combining a copper oxide or copper hydroxycarbonate with one or more binders and a support material in a granulator to form a granulated sorbent precursor,
   (ii) sulphiding the sorbent precursor with a gas mixture comprising 0.5-5% by volume hydrogen sulphide at a temperature in the range of 1-150° C. to form a sulphided copper material, and
   (iii) partially reducing the sulphided copper material to a lower oxidation state with a hydrogen gas mixture containing 20-80% $H_2$ by volume at a temperature in the range 150-350° C. for 5-24 hours to form the sorbent.

2. A sorbent according to claim 1, wherein the copper content of the sorbent is in the range of 20-40% by weight.

3. A sorbent according to claim 1, wherein the S:Cu atomic ratio of the sorbent is in the range of 0.8-0.95.

4. A sorbent according to claim 1, wherein the binder is a clay, cement or organic polymer binder, or a mixture thereof.

5. A sorbent according to claim 1, wherein the support material is alumina, hydrated alumina, metal-aluminate, silica, titania, zirconia, zinc oxide, an aluminosilicate, a zeolite, metal carbonate, or carbon, or a mixture thereof.

6. A sorbent according to claim 1 further comprising one or more zinc compounds.

7. A method for the production of a sorbent comprising 20-75% by weight of copper (expressed as copper (II) oxide) in the form of granules comprising one or more copper sulphides, a support and a binder, said sorbent having a sulphur to copper atomic ratio in the range 0.7 to 0.95:1, comprising the steps of:
  (i) making a sorbent precursor comprising an oxide or hydroxycarbonate of copper by either applying a layer of a copper compound on the surface of a shaped support material by dipping or spraying the shaped support material with a slurry of copper compound, and drying the coated support material; or by combining an oxide or hydroxycarbonate of copper, with one or more binders and a support material
  (ii) sulphiding the sorbent precursor with a gas mixture comprising 0.5-5% by volume hydrogen sulphide at a temperature in the range 1-150° C. to form a sulphided copper material, and
  (iii) partially reducing the sulphided copper material to a lower oxidation state with a hydrogen gas mixture containing 20-80% H2 by volume at a temperature in the range 150-350° C. for 5-24 hrs to form the sorbent, wherein the sorbent precursor or sorbent is shaped.

8. A method according to claim 7 wherein the sulphiding stage is carried out with hydrogen sulphide in an inert gas at a $H_2S$ concentration in the range 0.5 to 5% by volume.

9. A method according to claim 7 wherein the reduction temperature is in the range 175-300° C.

10. A process for the removal of mercury from a process fluid stream by contacting the fluid stream with the sorbent according to claim 1.

11. A process for the removal of mercury from a process fluid stream by contacting the fluid stream with the sorbent prepared according to the method of claim 7.

12. A sorbent according to claim 2 wherein the S:Cu atomic ratio of the sorbent is in the range 0.8-0.9.

13. A method according to claim 9 wherein the reduction temperature is in the range 200-250° C.

* * * * *